United States Patent
Takato (10) Patent No.: US 7,731,374 B2
(45) Date of Patent: Jun. 8, 2010

(54) RECONFIGURABLE INSTRUMENT CLUSTER

(75) Inventor: Kenichi Takato, Rochester Hills, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 356 days.

(21) Appl. No.: 11/583,528

(22) Filed: Oct. 19, 2006

(65) Prior Publication Data

US 2007/0090939 A1    Apr. 26, 2007

Related U.S. Application Data

(60) Provisional application No. 60/729,779, filed on Oct. 24, 2005.

(51) Int. Cl.
*G02F 1/335* (2006.01)
(52) U.S. Cl. .................. 362/26; 362/23; 362/27; 362/30
(58) Field of Classification Search ............ 701/1; 362/23, 26–30
See application file for complete search history.

(56) References Cited

U.S. PATENT DOCUMENTS

| | | | |
|---|---|---|---|
| 4,777,480 A | 10/1988 | Okamoto et al. | |
| 6,009,355 A * | 12/1999 | Obradovich et al. | 701/1 |
| 7,095,463 B2 * | 8/2006 | Usui et al. | 349/61 |
| 7,110,064 B2 * | 9/2006 | Kameda | 349/96 |
| 7,324,878 B2 * | 1/2008 | Imai et al. | 701/1 |
| 7,345,718 B2 * | 3/2008 | Harada et al. | 349/96 |
| 2005/0109261 A1 | 5/2005 | Tanaka et al. | |

FOREIGN PATENT DOCUMENTS

| | | |
|---|---|---|
| DE | 3119215 | 12/1982 |
| DE | 19816823 | 10/1998 |
| FR | 2729345 | 7/1996 |
| FR | 2760834 | 9/1998 |

OTHER PUBLICATIONS

International Search Report Dated Mar. 29, 2007.
International Search Report dated Mar. 2, 2007.
U.S. Patent Application: "Indication Change Instrument Cluster", U.S. Appl. No. 11/583,530, filed Oct. 19, 2006.
International Search Report and Written Opinion dated Feb. 22, 2007.

* cited by examiner

*Primary Examiner*—Anabel M Ton (57) ABSTRACT

An illuminated gauge for a vehicle instrument panel includes a single LCD having at least a first display configuration and a second display configuration different from the first display configuration. A pointer is selectively actuatable to operate within one of the first and the second display configurations. A selector is used to switch between the first and second display configurations.

20 Claims, 8 Drawing Sheets

Fig-7

RECONFIGURABLE INSTRUMENT CLUSTER

CROSS REFERENCE TO RELATED APPLICATION

The application claims priority to U.S. Provisional Application No. 60/729,779 which was filed on Oct. 24, 2005.

BACKGROUND OF THE INVENTION

This invention generally relates to an illuminated gauge for an instrument cluster. More particularly, this invention relates to an illuminated gauge utilizing a liquid crystal display (LCD) that is selectively reconfigurable to display multiple types of vehicle information.

Vehicles include instrument panels with illuminated gauges and pointers to indicate vehicle information such as speed, fuel economy, oil pressure, voltage, etc. An illuminated gauge is comprised of an LCD that is configured to display vehicle information, a pointer that is driven by a motor to indicate the appropriate vehicle information, a light source and light housing that cooperate to illuminate the pointer, and a polarizer that is used to control light transmission.

In order for a vehicle occupant to view the pointer on the illuminated gauge, the LCD must be cut to provide openings through which the pointer can be viewed. This cutting process is complicated and very expensive.

Further, in a traditional LCD configuration, each illuminated gauge typically includes one type of vehicle information. For example, a speedometer will display a range of speeds for one type of unit of measure, such as miles-per-hour (MPH). To display this information in another type of unit of measure, e.g. kilometers-per-hour (KPH), an additional gauge must be used, or the gauge must be replaced with another gauge that displays the appropriate units. This proliferates components and increases overall cost for an instrument cluster.

Accordingly, it is desirable provide a gauge configuration that is more cost effective in addition to overcoming the other above-mentioned difficulties in the prior art.

SUMMARY OF THE INVENTION

An illuminated gauge includes single liquid crystal display (LCD) that has at least a first display configuration and a second display configuration different from the first display configuration. A pointer is selectively actuatable to operate within one of the first and second display configurations. A selector is actuated to switch between the first and second display configurations.

In one example, the first display configuration displays information such as vehicle speed in one type of units of measure, such as miles per hour (MPH), for example; while the second display configuration displays different units of measure, such as kilometers per hour (KPH), for example.

The pointer is preferably configured as a single arm having a first portion to be driven by a power source and a second portion that is used to indicate the appropriate vehicle information in one of the first and second display configurations. At least one polarizer is positioned immediately adjacent to the single LCD. The polarizer includes an elimination area or hole through which the second portion of the pointer can be viewed by a vehicle occupant. Forming an opening in the polarizer to view the pointer is more cost effective than cutting into the LCD as traditionally was done.

Further, using a single LCD with multiple display configurations provides a cost-effective way for easily reconfiguring instrument panels. These and other features of the present invention can be best understood from the following specification and drawings, the following of which is a brief description.

DETAILED DESCRIPTION OF THE PREFERRED EMBODIMENT

Figure 1:
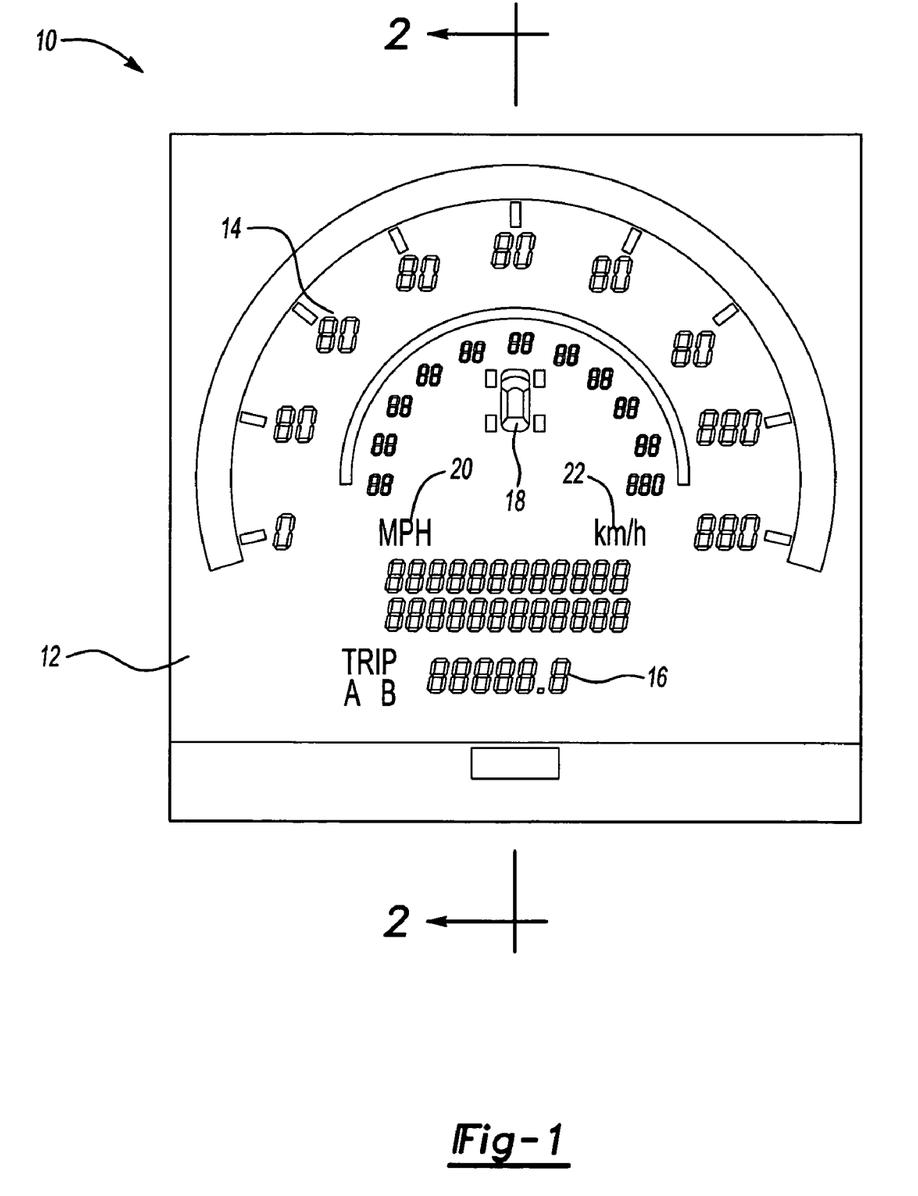
FIG. 1 is a front view of a gauge incorporating the subjection invention.

FIG. 1 shows an illuminated gauge 10 for an instrument cluster that is mounted within a vehicle dashboard (not shown). The illuminated gauge 10 comprises a single liquid crystal (LCD) 12 that is configured to display multiple types of vehicle information. For example, the LCD 12 can be configured to display vehicle speed 14, an odometer 16, a compass 18, and different types of units of measure, e.g. MPH 20 and KPH 22. It should be understood that the LCD 12 could be configured to display other types of information and/or other combinations of information. This will be discussed in greater detail below.

Figure 2:
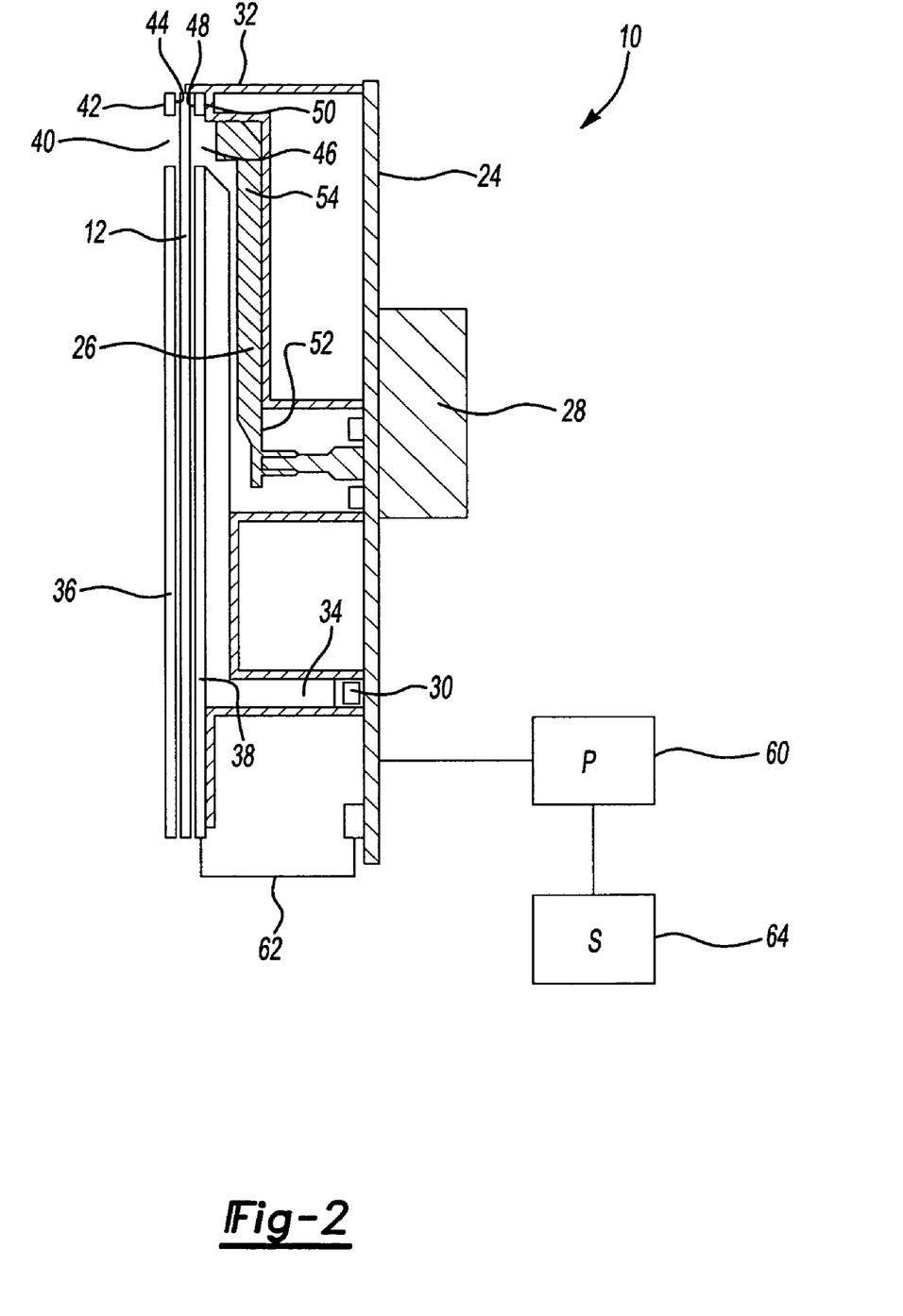
FIG. 2 is a cross-sectional view taken along line 2-2 in FIG. 1.

The gauge 10 is configured such that the LCD 12 displays selected types of information and/or units. As shown in FIG. 2, the gauge 10 includes a printed circuit board (PCB) 24, a pointer 26 supported on the PCB 24, and a power source 28 that is connected to the PCB 24 to drive the pointer 26. The power source 28 can comprise a motor, for example, which can be mounted on either side of the PCB 24. At least one light source 30 is connected to the PCB 24 to illuminate the LCD 12 and pointer 26. A light housing 32 and light guide 34 cooperate to direct light toward the LCD 12 and pointer 26.

Figure 3:
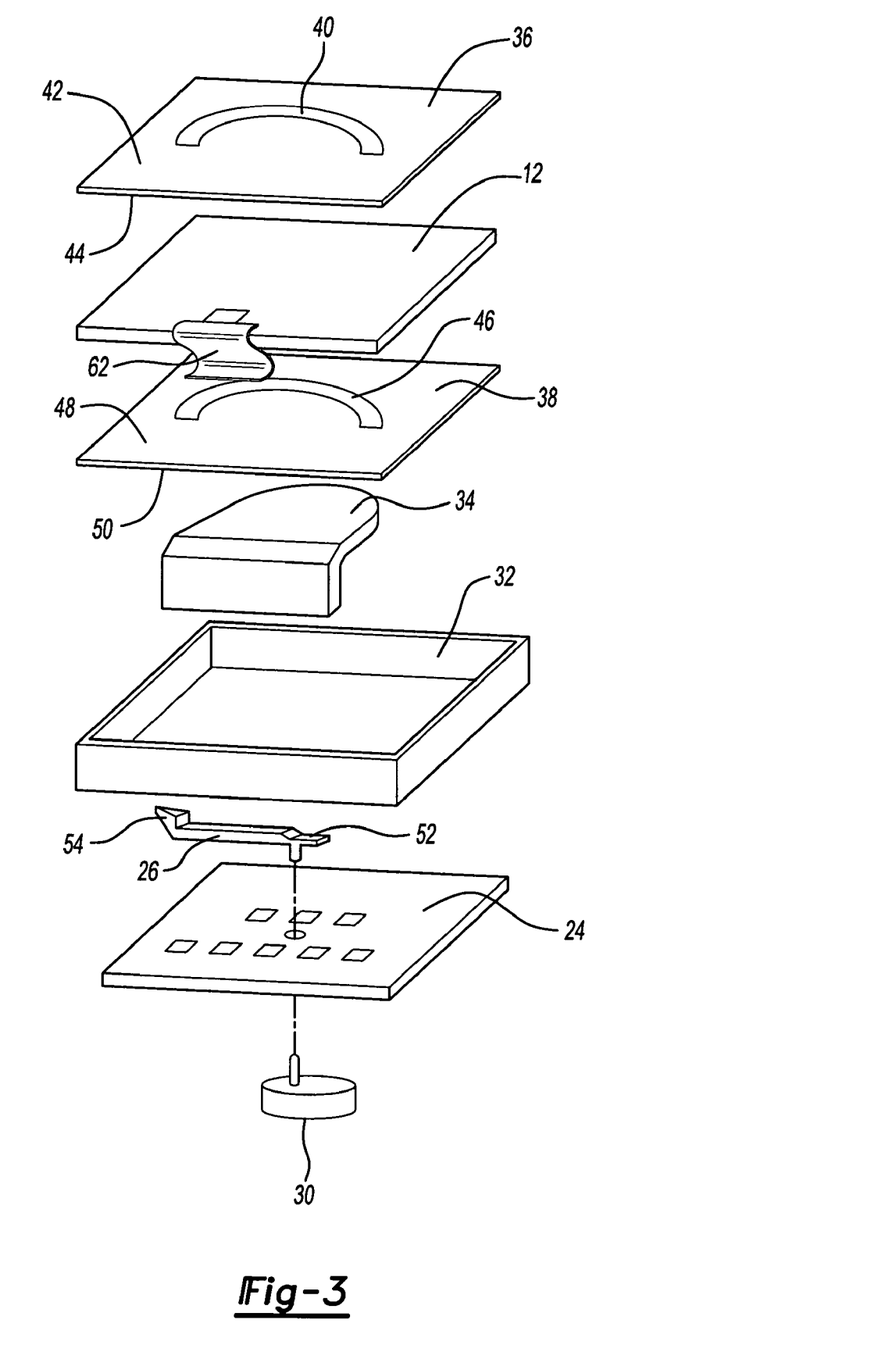
FIG. 3 is an exploded view of the gauge of FIG. 1.

As best shown in FIGS. 2-3, a first polarizer 36 is positioned on one immediate side of the single LCD 12 and a second polarizer 38 is positioned on an opposite side of the single LCD 12. A first opening or first elimination area 40 is formed or cut within the first polarizer 36. This first elimination area 40 extends entirely through a thickness of the first polarizer 36, i.e. extends from a first planar surface 42 to a second, opposite, planar surface 44. The second polarizer 38 includes a second opening or second elimination area 46 that is configured similar to that of the first elimination area 40. The second elimination area 46 extends entirely through a thickness of the second polarizer 38 from a first planar surface 48 to a second planar surface 50.

The pointer 26 comprises a single arm that has a first portion 52 coupled to the power source 28 and a second portion 54 that moves relative to the LCD to indicate the appropriate vehicle information. The first 36 and second 38 polarizers control light transmission as known. The second portion 54 of the pointer 26 is viewable by a vehicle occupant as a result of the first 40 and second 46 elimination areas. By forming these areas in the polarizers, cutting of the LCD is avoided. Thus, a common LCD can be used in many different instrument configurations, which decreases cost.

A control unit or microprocessor 60 is electrically connected to the PCB 24. The microprocessor 60 is configured to generate commands to control the pointer 26 via the power source 28. The microprocessor 60 is also electrically connected via connector 62 to the LCD 12. The microprocessor 60 sends a signal to the LCD 12 to identify the desired display configuration. A selector 64 is actuatable to select between different types of display configurations. The selector 64 could comprise a button or switch that could be actuated by a vehicle user, or could be a control that is initially pre-programmed to display a desired one of a plurality of different types of display configurations. Examples of these display configurations are discussed in detail below.

Figure 4A:
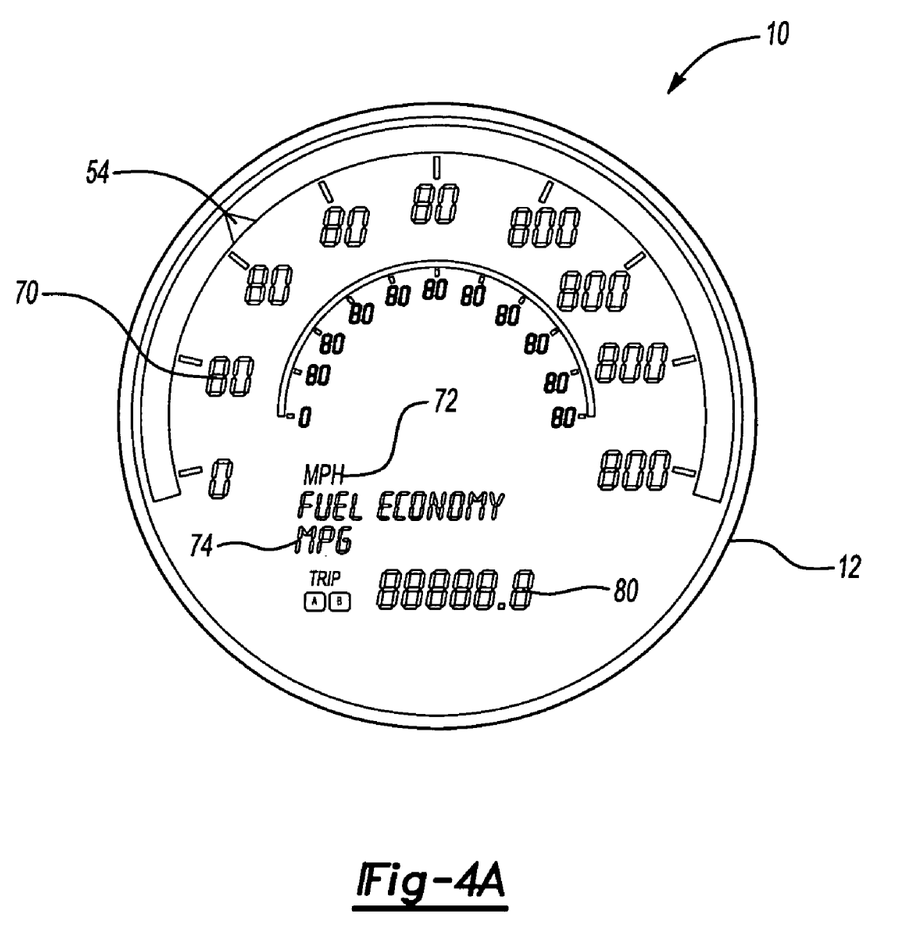
FIG. 4A is a gauge displaying vehicle speed in MPH.
Figure 4B:
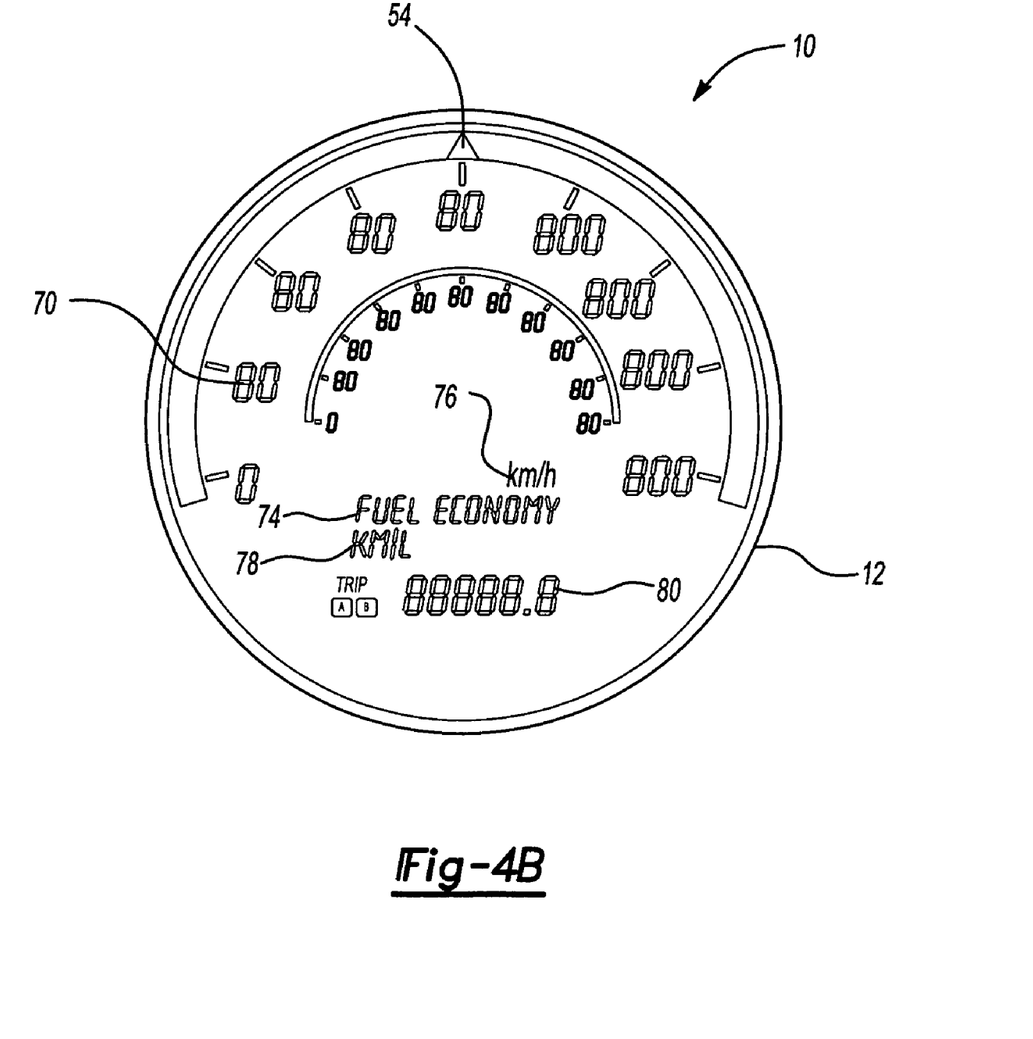
FIG. 4B is the gauge of FIG. 4A displaying the vehicle speed in KPH.

FIGS. 4A and 4B show one type of display configuration for vehicle speed. FIG. 4A shows vehicle speed 70 displayed in English units of measure, e.g. MPH 72. The pointer 26 moves to indicate the appropriate vehicle speed 70 and can be seen as a result of the elimination areas 40, 46 discussed above. In addition to vehicle speed 70, the single LCD 12 could also be configured to display additional vehicle information. In the example shown in FIGS. 4A and 4B, the additional information is fuel economy 74, which in FIG. 4A is shown in English units of measure, i.e. miles-per-gallon (MPG). FIG. 4B shows the same information as FIG. 4A, i.e. vehicle speed 70 and fuel economy 74, but uses metric units of measure such as kilometers-per-hour (KPH) 76 and kilometers-per-liter (KPL) 78. Additionally, the LCD 12 could be configured to display odometer information 80.

Figure 5:
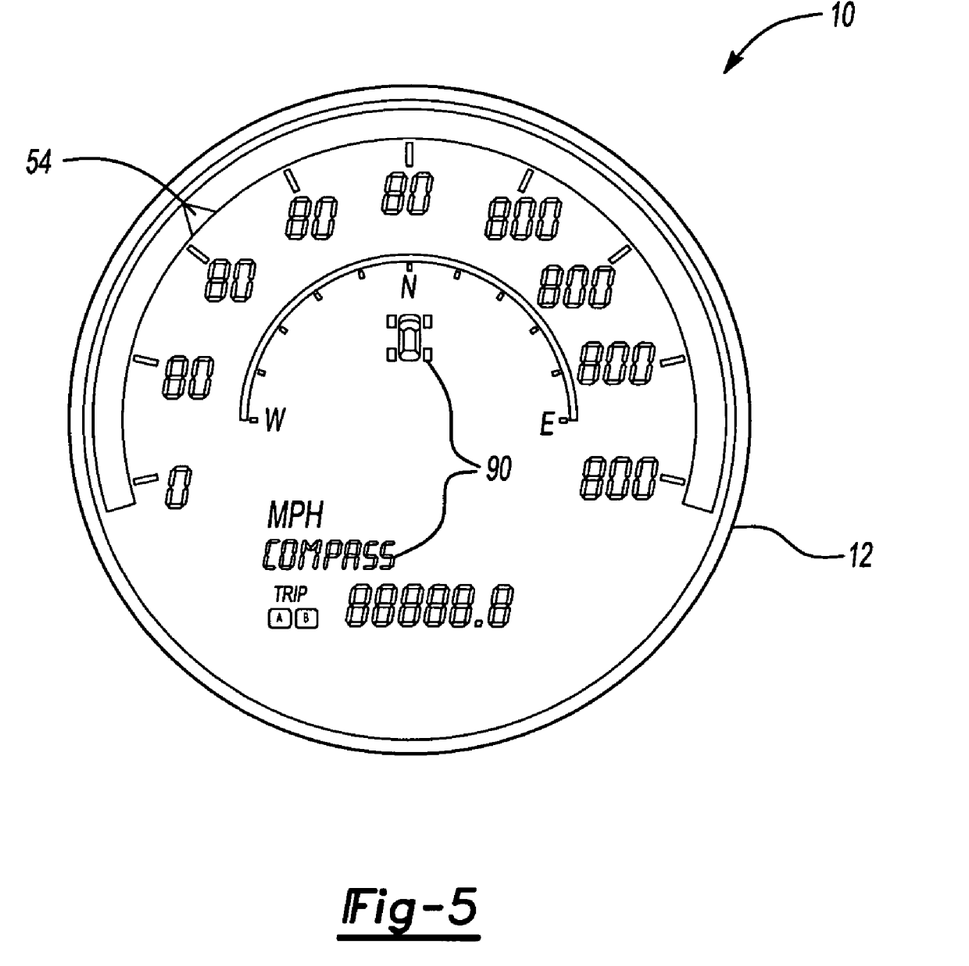
FIG. 5 is the gauge of FIG. 4A showing an additional type of vehicle information.
Figure 6:
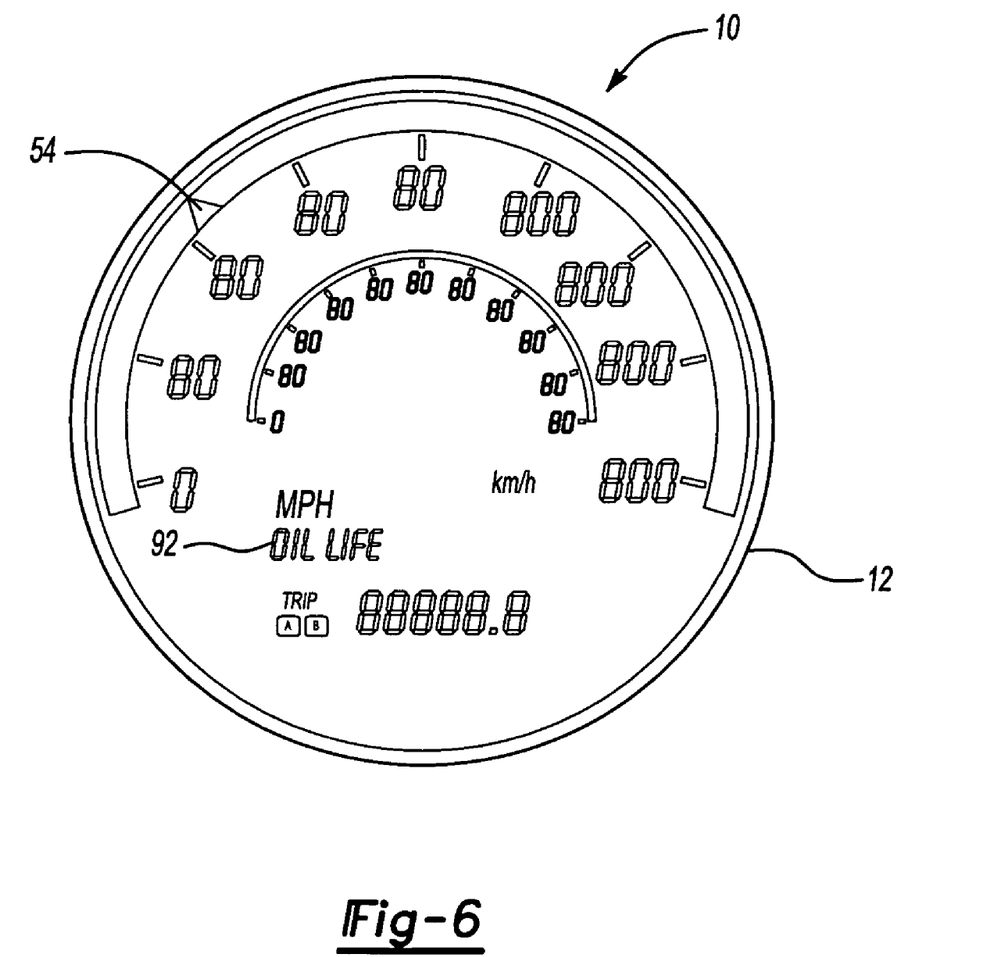
FIG. 6 is the gauge of FIG. 4A showing an additional type of vehicle information.
Figure 7:
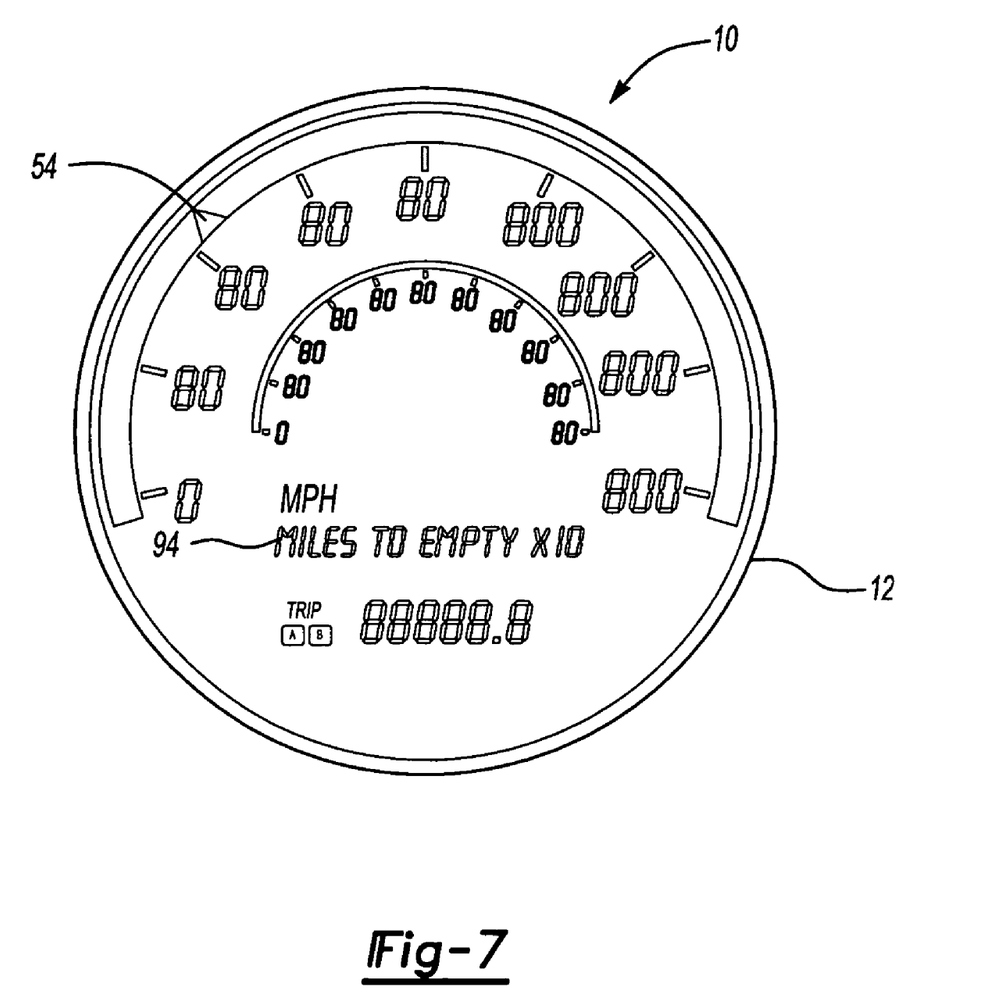
FIG. 7 is the gauge of FIG. 4A showing an additional type of vehicle information.

FIGS. 5-7 are similar to the gauge of FIG. 4A but show different examples for display configurations for other types of vehicle information. FIG. 5 shows a compass display 90, FIG. 6 shows an oil life display 92, and FIG. 7 shows a distance to empty display 94. As with the gauges of FIGS. 4A and 4B, the gauges shown in FIGS. 5-7 can be configured to display either English or metric units. Further, the different types of information and/or display configurations could easily be selected by a user via the selector 64 as discussed above. Further, by using the single LCD 12 with multiple display configurations and polarizers with elimination areas provides a cost-effective way to easily reconfigure instrument displays.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An illuminated gauge for an instrument cluster comprising:
   a single liquid crystal display (LCD) including at least a first display configuration and a second display configuration different from the first display configuration;
   at least one polarizer adjacent said single LCD wherein said at least one polarizer includes an elimination area;
   a pointer to be driven by a power source for movement relative to said single LCD, said pointer being selectively actuatable to operate within one of said first and said second display configurations, and wherein said pointer extends to a distal end that indicates desired vehicle information in one of said first and second display configurations, said distal end being aligned with said elimination area; and
   a selector to be actuatable to switch between said first and said second display configurations.

2. The illuminated gauge according to claim 1 wherein said pointer includes a single arm having a first portion coupled to the power source and a second portion indicating desired vehicle information in one of said first and second display configurations.

3. An illuminated gauge for an instrument cluster comprising:
   a single liquid crystal display (LCD) including at least a first display configuration and a second display configuration different from the first display configuration;
   a pointer to be driven by a power source for movement relative to said single LCD, said pointer being selectively actuatable to operate within one of said first and said second display configurations, and wherein said pointer includes a single arm having a first portion coupled to the power source and a second portion indicating desired vehicle information in one of said first and second display configurations;
   a selector to be actuatable to switch between said first and said second display configurations; and
   at least one polarizer positioned immediately adjacent said single LCD.

4. The illuminated gauge according to claim 3 wherein said at least one polarizer includes a hole through which said second portion of said pointer is visible.

5. The illuminated gauge according to claim 3 wherein said at least one polarizer comprises a first polarizer positioned on one side of said single LCD and a second polarizer positioned on an opposite side of said single LCD.

6. The illuminated gauge according to claim 5 wherein said first and said second polarizers include first and second holes, respectively, that are aligned with each other and through which said second portion of said pointer is visible.

7. The illuminated gauge according to claim 6 wherein each of said first and second polarizers includes a first planar surface and a second planar surface opposite said first planar surface, with a respective one of said first and second holes extending entirely through said first and second polarizers from said first planar surface to said second planar surface.

8. An illuminated gauge for an instrument cluster comprising:
   a single liquid crystal display (LCD) including at least a first display configuration and a second display configuration different from the first display configuration;
   a pointer to be driven by a power source for movement relative to said single LCD, said pointer being selectively actuatable to operate within one of said first and said second display configurations;
   a printed circuit board, at least one light source supported by said printed circuit board, and a light guide that guides light from said at least one light source to illuminate said pointer and said single LCD; and
   a selector to be actuatable to switch between said first and said second display configurations.

9. The illuminated gauge according to claim 1 wherein said first display configuration comprises a display for a first type of vehicle information in a first set of units of measure and said second display configuration comprises a display for the first type of vehicle information in a second set of units of measure different than the first set of units of measure.

10. The illuminated gauge according to claim 9 wherein said single LCD includes a third display configuration that displays a second type of vehicle information different than said first type of vehicle information.

11. An illuminated gauge for an instrument cluster comprising:
   a single liquid crystal display (LCD) including at least a first display configuration and a second display configuration different from the first display configuration;
   a pointer movable relative to said single LCD, said pointer being selectively actuatable to operate within one of said first and said second display configurations;
   at least one polarizer positioned immediately adjacent said single LCD
   a printed circuit board supporting said pointer;
   a power source that drives said pointer;
   at least one light source supported by said printed circuit board;
   a light guide that guides light from said at least one light source to illuminate said pointer and said single LCD; and
   a selector to be actuatable to switch between said first and said second display configurations.

12. The illuminated gauge according to claim 11 wherein said pointer comprises a single arm having a first portion coupled to said power source and a second portion indicating desired vehicle information in one of said first and second display configurations.

13. The illuminated gauge according to claim 12 wherein said at least one polarizer comprises a first polarizer positioned on one immediate side of said single LCD and a second polarizer positioned on an opposite immediate side of said single LCD.

14. The illuminated gauge according to claim 13 wherein said first and said second polarizers include first and second elimination areas, respectively, that are aligned with each other and through which said second portion of said pointer is visible.

15. The illuminated gauge according to claim 11 wherein said first display configuration comprises vehicle information displayed with a first set of units of measure and said second display configuration comprises the vehicle information displayed with a second set of units of measure different from said first set of units of measure.

16. The illuminated gauge according to claim 11 wherein the vehicle information comprises a first type of vehicle information and including a third display configuration that comprises a second type of vehicle information that is displayed simultaneously with the first type of vehicle information.

17. The illuminated gauge according to claim 1 wherein said at least one polarizer comprises a first polarizer positioned on one side of said single LCD and a second polarizer positioned on an opposite side of said single LCD.

18. The illuminated gauge according to claim 17 wherein said second polarizer includes an elimination area overlapping the elimination area of the first polarizer and through which the distal end of said pointer is visible.

19. The illuminated gauge according to claim 1 wherein said pointer comprises a single arm having a first portion coupled to the power source and extending to said distal end, and wherein the elimination area is formed adjacent an outer peripheral edge of the LCD with the other of said first and said second display configurations being located inwardly of the elimination area.

20. The illuminated gauge according to claim 19 including a printed circuit board, at least one light source supported by said printed circuit board, and a light guide that guides light from said at least one light source to illuminate said pointer.

* * * * *